(12) United States Patent
Ramdas

(10) Patent No.: US 11,983,263 B2
(45) Date of Patent: May 14, 2024

(54) VIRTUAL MACHINES TO INSTALL UNTRUSTED EXECUTABLE CODES

(71) Applicant: HEWLETT-PACKARD DEVELOPMENT COMPANY, L.P., Spring, TX (US)

(72) Inventor: Tirath Ramdas, Kewl (AU)

(73) Assignee: Hewlett-Packard Development Company, L.P., Spring, TX (US)

( * ) Notice: Subject to any disclaimer, the term of this patent is extended or adjusted under 35 U.S.C. 154(b) by 141 days.

(21) Appl. No.: 17/552,443

(22) Filed: Dec. 16, 2021

(65) Prior Publication Data

US 2023/0195881 A1  Jun. 22, 2023

(51) Int. Cl.
| | | |
|---|---|---|
| G06F 21/53 | (2013.01) | |
| G06F 21/54 | (2013.01) | |
| G06F 21/55 | (2013.01) | |
| G06F 21/56 | (2013.01) | |

(52) U.S. Cl.
CPC .............. *G06F 21/53* (2013.01); *G06F 21/54* (2013.01); *G06F 21/554* (2013.01); *G06F 21/564* (2013.01); *G06F 21/566* (2013.01)

(58) Field of Classification Search
CPC ........ G06F 21/53; G06F 21/54; G06F 21/554; G06F 21/564; G06F 21/566
See application file for complete search history.

(56) References Cited

U.S. PATENT DOCUMENTS

| | | | | |
|---|---|---|---|---|
| 7,779,472 B1* | 8/2010 | Lou | ....................... | G06F 21/566 726/25 |
| 8,713,631 B1* | 4/2014 | Pavlyushchik | ........ | G06F 21/566 726/1 |
| 9,165,136 B1* | 10/2015 | VanLund | ............ | G06F 9/45558 |
| 2007/0174915 A1* | 7/2007 | Gribble | ................. | G06F 21/566 726/24 |
| 2009/0271867 A1* | 10/2009 | Zhang | ...................... | G06F 21/56 711/6 |
| 2012/0030731 A1* | 2/2012 | Bhargava | ................ | H04L 63/10 726/3 |
| 2013/0086684 A1* | 4/2013 | Mohler | .................... | G06F 21/53 726/24 |
| 2014/0090077 A1* | 3/2014 | Jeong | ....................... | G06F 21/51 726/26 |
| 2015/0205963 A1* | 7/2015 | Zou | ........................ | G06F 21/566 726/23 |
| 2017/0103201 A1* | 4/2017 | Fox | ......................... | H04L 63/20 |
| 2017/0103202 A1* | 4/2017 | Kim | ....................... | G06F 21/564 |
| 2017/0142156 A1* | 5/2017 | Shiraishi | .................. | G06F 21/52 |
| 2022/0327207 A1* | 10/2022 | Turbin | .................... | G06F 21/568 |
| 2023/0161872 A1* | 5/2023 | Jang | ......................... | G06F 21/54 726/22 |

\* cited by examiner

*Primary Examiner* — Trong H Nguyen
(74) *Attorney, Agent, or Firm* — Quarles & Brady LLP

(57) ABSTRACT

In some examples, an electronic device includes a processor to allow installation of an untrusted executable code to a virtual machine, monitor the installation and execution of the untrusted executable code, and, responsive to a determination that an executed amount of the untrusted executable code is less than a threshold amount, prompt a user to continue the execution of the untrusted executable code.

20 Claims, 7 Drawing Sheets

VIRTUAL MACHINES TO INSTALL UNTRUSTED EXECUTABLE CODES

BACKGROUND

Electronic devices such as desktops, laptops, notebooks, tablets, and smartphones enable users to install executable code to perform different operations. While some executable code is trusted, other executable code includes malicious third-party executable code that compromises a security of the electronic device.

BRIEF DESCRIPTION OF THE DRAWINGS

Various examples are described below referring to the following figures.

DETAILED DESCRIPTION

Figure 1:
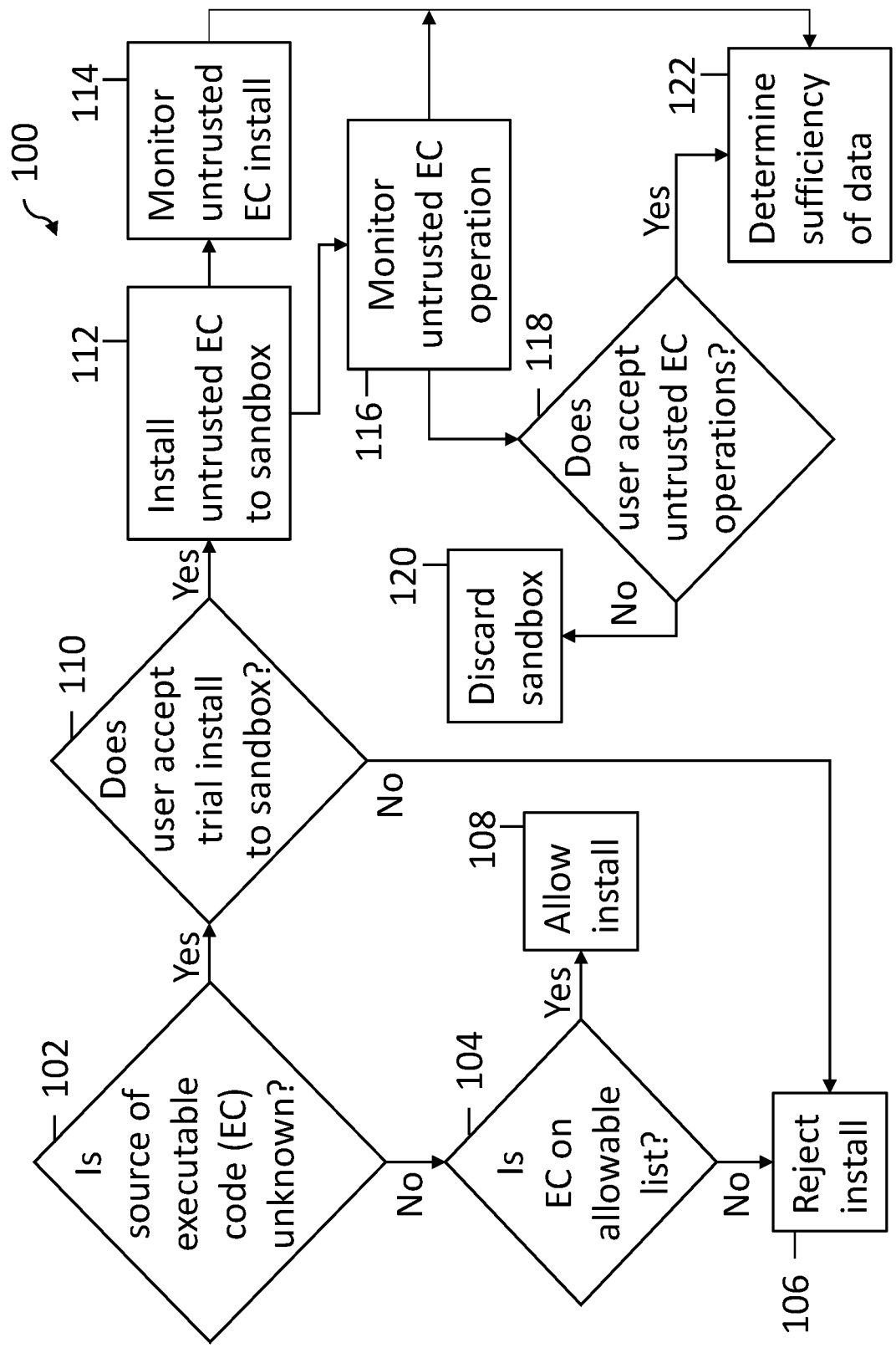
FIG. 1 is a flow diagram depicting a method for a system for utilizing virtual machines to install untrusted executable codes, in accordance with various examples.

As described above, electronic devices enable installation of executable code that may include malicious third-party executable code. Malicious third-party executable code is herein referred to as malware. A trusted executable code, as used herein, refers to executable code that is provided by a known source, has been tested for security purposes, or a combination thereof. An untrusted executable code, as used herein, refers to executable code that is provided by an unknown source, has not been tested for security purposes, or a combination thereof. Untrusted executable code is untrusted because of potential inclusion of malware. To block malware, different enterprises (e.g., institutions, business entities) enact policies that prevent a user of an enterprise from installing untrusted executable code. For instance, allowlisting, as used herein, is a policy that enables executable code on an allowed list of executable code to be installed because the executable code has been determined to be trusted.

To install executable code that is absent from the allowed list of executable code, the user requests an administrator of the enterprise to approve the untrusted executable code for installation. The administrator performs testing to determine a trustworthiness of the untrusted executable code. However, the administrator is not the user of the untrusted executable code and may not be able to verify a usefulness of the untrusted executable code. In some instances, malware is hidden in areas of the untrusted executable code that provides the usefulness and thereby avoids detection by the administrator. While the user is able to verify the usefulness of the untrusted executable code, the user may not be able to determine the trustworthiness of the untrusted executable code. Having to wait for the administrator to test and approve the untrusted executable code for installation reduces user productivity by blocking user access to executable code that would enhance performance of work tasks. Enabling the user to install the untrusted executable code without determining trustworthiness may compromise a security of the enterprise.

This description describes an electronic device that includes a virtual machine that enables the user to test an untrusted executable code for usefulness as well as to collect data to determine trustworthiness of the untrusted executable code. Responsive to a determination that an executable code is untrusted, a processor generates a virtual machine to which the untrusted executable code is installed. In some examples, a hypervisor of the electronic device generates the virtual machine and monitors activities of the virtual machine. In some examples, a shared folder is generated to which the user stores data for utilizing with the untrusted executable code. The processor monitors installation of the untrusted executable code to determine whether the installation includes known malware. Responsive to a determination that the installation does include known malware, the processor terminates installation of the untrusted executable code, removes the virtual machine, generates a report indicating the untrusted executable code, or a combination thereof. Responsive to a determination that the installation does not include known malware, the processor monitors execution of the untrusted executable code.

During the monitoring, the processor collects data on events generated by the untrusted executable code. The events include attempts to access a network, attempts to access stored data, or a combination thereof. The processor tracks an executed amount of the untrusted executable code. Responsive to detection of malware within the untrusted executable code, the processor terminates execution of the untrusted executable code, blocks user access to the virtual machine, generates a report indicating the untrusted executable code includes the malware, or a combination thereof. Responsive to a determination that the executed amount of the untrusted executable code is less than a threshold amount, the processor prompts the user to continue execution of the untrusted executable code. Responsive to a determination that the executed amount of the untrusted executable code is equivalent to or exceeds the threshold amount, the processor generates a report that includes the data collected during the monitoring.

By utilizing the virtual machine that enables the user to test untrusted executable code, the untrusted executable code is tested in an isolated and controlled environment that prevents security breaches to the electronic device, the enterprise, or a combination thereof. The untrusted executable code is tested for usability and trustworthiness by the user who has a vested interest in the usability of the untrusted executable code and a knowledge of what enhances performance of work tasks. User productivity is enhanced by enabling the user access to untrusted executable code that aids the user in performance of work tasks. Responsive to a determination that the untrusted executable code has been sufficiently tested, the untrusted executable code is determined to be trusted executable code. An administrator's ability to determine a security policy for the trusted executable code is enhanced by the thoroughness of the testing. Security policy, as used herein, determines if and how executable code is distributed to an enterprise and how the executable code is monitored once installed. For instance, the security policy includes allowlisting the trusted executable code.

In some examples in accordance with the present description, an electronic device is provided. The electronic device includes a processor to allow installation of an untrusted executable code to a virtual machine, monitor the installation and execution of the untrusted executable code, and, responsive to a determination that an executed amount of the untrusted executable code is less than a threshold amount, prompt a user to continue the execution of the untrusted executable code.

In other examples in accordance with the present description, a method is provided. The method includes determining an executable code is untrusted, installing the untrusted executable code to a virtual machine, monitoring installation and execution of the untrusted executable code, and generating a report that includes data collected during the monitoring.

In yet other examples in accordance with the present description, a non-transitory machine-readable medium is provided. The term "non-transitory," as used herein, does not encompass transitory propagating signals. The non-transitory machine-readable medium stores machine-readable instructions, which, when executed by a processor, cause the processor to enable a virtual machine to install an untrusted executable code and to monitor installation of the untrusted executable code to determine whether the installation includes a malware. Responsive to a determination that the malware is absent from the installation, the machine-readable instructions, when executed by a processor, cause the processor to monitor execution of the untrusted executable code. Responsive to a determination that an executed amount of the untrusted executable code is equivalent to or exceeds a threshold amount, the machine-readable instructions, when executed by a processor, cause the processor to generate a report.

Executable code, as used herein, includes "applications," "software," and "firmware." "Applications," "software," and "firmware" are considered to be interchangeable in the context of the examples provided. "Firmware" is considered to be machine-readable instructions that a processor executes prior to execution of an operating system (OS), with a small portion that continues after the OS bootloader executes (e.g., a callback procedure), for example. "Applications" and "software" are considered broader terms than "firmware," and are considered to refer to machine-readable instructions that execute after the OS bootloader starts, through OS runtime, and until the electronic device (e.g., a peripheral device) shuts down, for example.

Referring now to FIG. 1, a flow diagram depicting a method 100 for a system for utilizing virtual machines to install untrusted executable codes is provided, in accordance with various examples. The method 100 includes determining whether a source of an executable code is unknown (102). The executable code is shown in FIG. 1 as EC. Responsive to a determination that the source of the executable code is known, the method 100 also includes determining whether the executable code is on a list of allowable executable code (104). Responsive to a determination that the executable code is absent from the list of allowable executable code, the method 100 rejects installation of the executable code (106). Responsive to a determination that the list of allowable executable code includes the executable code, the method 100 allows installation of the executable code to the system (108).

Additionally, responsive to a determination that the source of the executable code is unknown, the method 100 also includes determining whether a user accepts a trial install of the untrusted executable code to a sandbox (110). A sandbox, as used herein, is a virtual machine. Responsive to a determination that the user rejects the trial install, the method 100 rejects installation of the executable code (106) that is untrusted. Responsive to a determination that the user accepts the trial install, the method 100 allows installation of the untrusted executable code to the sandbox (112). The method 100 also includes monitoring the installation of the untrusted executable code (114). Additionally, the method 100 includes monitoring operation of the untrusted executable code (116). The method 100 also includes determining whether the user accepts the operations of the untrusted executable code (118). The operations, as used herein, refers to execution of the untrusted executable code. Responsive to a determination that the user rejects the operations of the untrusted executable code, the method 100 includes discarding the sandbox (120). Responsive to a determination that the user accepts the operations of the executable code, the method 100 additionally includes determining a sufficient of the data (122).

In various examples, a system for utilizing virtual machines to install untrusted executable codes includes a processor for performing the method 100. To determine whether a source of an executable code is unknown, the processor compares the source of the executable code to sources of an allowed list of executable codes, sources of an unallowed list of executable codes, or a combination thereof. In some examples, responsive to a determination that the source of the executable code is absent from the allowed list of executable codes, the processor removes an installer of the executable code from the system. In other examples, responsive to a determination that the source of the executable code is on the unallowed list of executable codes, the processor removes the installer of the executable code from the system.

As described above, in some examples, responsive to the determination that the user accepts the trial install of the untrusted executable code, the processor generates the virtual machine and monitor activities of the virtual machine utilizing a hypervisor. The hypervisor emulates an operating environment of an electronic device, as described below with respect to FIG. 2. In other examples, responsive to the determination that the user rejects the trial install of the untrusted executable code, the processor removes the installer of the untrusted executable code from the system.

In various examples, the processor monitors installation of the untrusted executable code to determine whether the installation includes a known malware. Responsive to a determination that the installation does not include the known malware, the processor monitors the operations of the untrusted executable code. In some examples, the processor generates a shared folder to which the user stores data for utilizing with the untrusted executable code. The processor monitors access of the stored data by the untrusted executable code during operations of the untrusted executable code. During the monitoring of the installation, the operations, or a combination thereof, of the untrusted executable code, the processor collects event data generated by the untrusted executable code. The event data includes attempts to access a network, attempts to access the stored data, or a combination thereof. In various examples, responsive to detection of the known malware within the untrusted executable code during installation, operations, or the combination thereof, of the untrusted executable code, the processor terminates operations of the untrusted executable code. In some examples, the processor blocks user access to the virtual machine, generates a report indicating the untrusted executable code includes the malware, or a combination thereof. In other examples, the processor removes the installer of the untrusted executable code from the system. In some examples, the processor adds the source of the untrusted executable code to the unallowed list of executable codes.

As described above, during the monitoring of the installation, of the operations, or a combination thereof, of the untrusted executable code, the processor tracks the executed amount of the untrusted executable code. The processor utilizes the executed amount of the untrusted executable code to determine the sufficiency of the event data. Responsive to a determination that the executed amount of the untrusted executable code is less than the threshold amount, the processor prompts the user to continue execution of the untrusted executable code. Responsive to a determination that the executed amount of the untrusted executable code is equivalent to or exceeds the threshold amount, the processor generates a report that includes the event data. In various examples, responsive to a determination that the untrusted executable code has been sufficiently tested, the untrusted executable code is determined to be trusted executable code. In some examples, the untrusted executable code is added to the allowed list of executable codes.

In various examples, an initial value for the threshold amount is determined by the security policy of the enterprise. For example, the security policy establishes the threshold amount as an amount that increases a likelihood of detection of malware hidden in non-malicious files utilized by the untrusted executable code. The malware hidden in the files includes macros, scripts, or a combination thereof. In some examples, an executable code provides a graphical user interface (GUI) that enables an administrator of the system to adjust the threshold amount. The threshold amount is stored to a storage device of the system.

While the method 100 includes determining whether the user accepts the trial install to the sandbox, in other examples, the method 100 installs the untrusted executable code to the sandbox responsive to the determination that the source of the untrusted executable code is unknown. For example, the method 100 includes prompting the user to accept the trial installation responsive to a governmental regulation or standard. For example, the governmental regulation or standard governs data privacy of the user.

By utilizing the virtual machine to install the untrusted executable code, the shared folder for storing data utilized by the untrusted executable code, or a combination thereof, the processor enables testing of the untrusted executable code in an isolated and controlled environment. Testing the untrusted executable code in the isolated and controlled environment prevents security breaches to the system. The untrusted executable code is tested for usability and trustworthiness by the user who has a vested interest in the usability of the untrusted executable code and a knowledge of what enhances performance of work tasks. User productivity is enhanced by enabling the user access to the untrusted executable code that aids the user in performance of work tasks.

Figure 2:
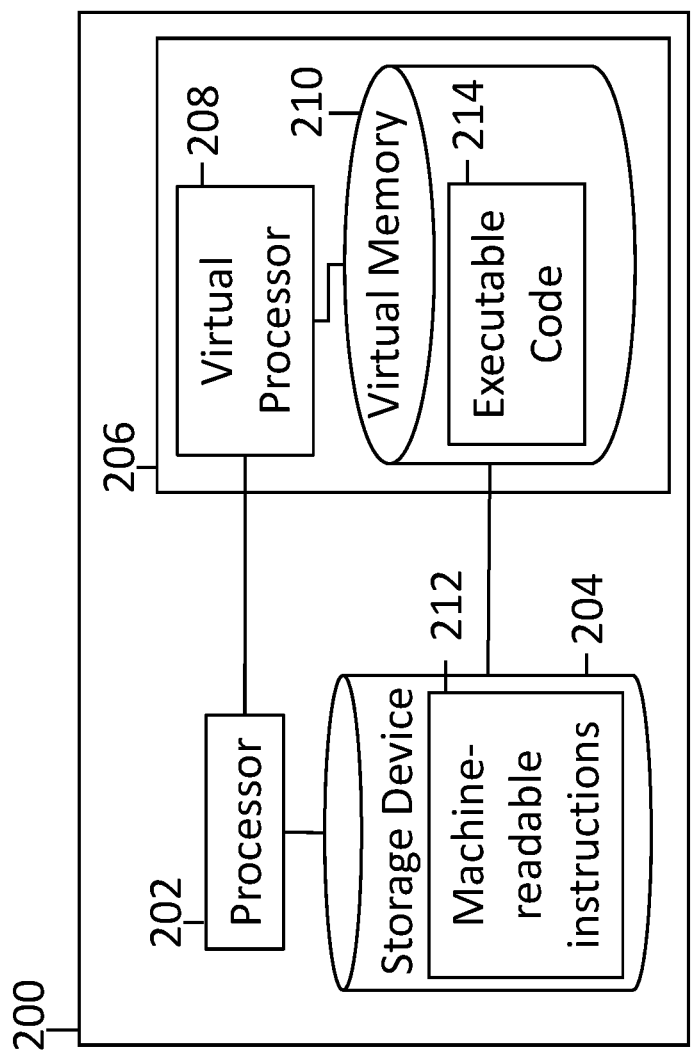
FIG. 2 is a block diagram depicting an electronic device for utilizing virtual machines to install untrusted executable codes, in accordance with various examples.

Referring now to FIG. 2, a block diagram depicting an electronic device 200 for utilizing virtual machines to install untrusted executable codes is provided, in accordance with various examples. The electronic device 200 is the system for performing the method 100, for example. The electronic device 200 includes a processor 202, a storage device 204, and a virtual machine 206. The electronic device is a desktop, a laptop, a notebook, a tablet, a smartphone, or other suitable computing device able to generate the virtual machine 206, for example. The processor 202 is a microprocessor, a microcomputer, a microprocessor, a programmable integrated circuit, a programmable gate array, or other suitable device for managing operations of the electronic device 200 or a component or multiple components of the electronic device 200. For example, the processor 202 is a central processing unit (CPU), a graphics processing unit (GPU), or an embedded security processor (EpSC). In another example, the processor 202 is an embedded artificial intelligence (eAI) of a network interface (not explicitly shown). The storage device 204 is a hard drive, a solid-state drive (SSD), flash memory, random access memory (RAM), or other suitable memory for storing data or machine-readable instructions of the electronic device 200. The virtual machine 206 includes a virtual processor 208 and a virtual memory 210. The processor 202 allocates a portion of processor usage to the virtual processor 208, for example. The processor 202 allocates a portion of memory locations of the storage device 204 to the virtual memory 210, for example.

While not explicitly shown, in some examples, the electronic device 200 includes network interfaces, video adapters, sound cards, local buses, peripheral devices (e.g., a keyboard, a mouse, a touchpad, a speaker, a microphone, a display device), or a combination thereof. In various examples, the processor 202 is coupled to the storage device 204 and the virtual machine 206. The storage device 204 is coupled to the processor 202 and the virtual machine 206. The virtual machine 206 is coupled to the processor 202 and the storage device 204. In some examples, the processor 202 is coupled to the virtual processor 208. In some examples, the storage device 204 is coupled to the virtual memory 210. In various examples, the virtual processor 208 is coupled to the processor 202 and the virtual memory 210. The virtual memory 210 is coupled to the virtual processor 208 and the storage device 204. The virtual memory 210 stores an executable code 214. The executable code 214 is the untrusted executable code, for example.

In various examples, the storage device 204 stores machine-readable instructions 212, which, when executed by the processor 202, cause the processor 202 to perform some or all of the actions attributed herein to the processor 202. The machine-readable instructions 212, when executed by the processor 202, cause the processor 202 to perform some or all of the method 100, for example. As described above with respect to FIG. 1, the processor 202 generates the virtual machine 206 and monitors activities of the virtual machine 206 utilizing a hypervisor. The hypervisor emulates an operating environment of the electronic device 200. In some examples, the hypervisor acts as the OS of the electronic device 200 and executes directly on the processor 202. In other examples, the hypervisor executes as a layer between the OS of the electronic device 200 and the virtual machine 206.

The hypervisor enables sharing of processing and memory resources between multiple virtual machines (not explicitly shown). In various examples, the hypervisor enables allocation of different portions of processor usage of the processor 202 to different virtual machines. For example, the hypervisor enables allocation of a first percentage of the processor usage of the processor 202 to the virtual machine 206 and a second percentage of the processor usage of the processor 202 to another virtual machine (not explicitly shown). In some examples, the hypervisor enables allocation of different portions of memory locations of the storage device 204 to different virtual machines. For example, the hypervisor enables allocation of a first percentage of capacity of the storage device 204 to the virtual machine 206 and a second percentage of capacity of the storage device 204 to another virtual machine (not explicitly shown).

In some examples, the hypervisor generates the shared folder to which the user stores data to be utilized by the untrusted executable code. The hypervisor generates the shared folder on the storage device 204, for example. In various examples, the hypervisor monitors attempts by the untrusted executable code to access a network via a network interface (not explicitly shown), attempts to access the shared folder, or a combination thereof, and generates event data for the attempts.

In various examples, the hypervisor discards the virtual machine 206. For example, responsive to a determination that the user rejects the operations of the untrusted executable code, the hypervisor discards the virtual machine 206. In various examples, responsive to the determination that the user rejects operations of the untrusted executable code, the hypervisor deletes the shared folder storing data stored by the user for utilization by the untrusted executable code. In another example, responsive to a determination that the untrusted executable code includes a malware, the hypervisor discards the virtual machine 206. In some examples, responsive to the determination that the untrusted executable code includes the malware, the hypervisor deletes the shared folder storing data stored by the user for utilization by the untrusted executable code.

By utilizing the hypervisor, the processor 202, the storage device 204, or a combination thereof, are isolated from the untrusted executable code. Isolating the untrusted executable code in an isolated and controlled environment provided by the hypervisor, prevents security breaches to electronic device 200.

Figure 3:
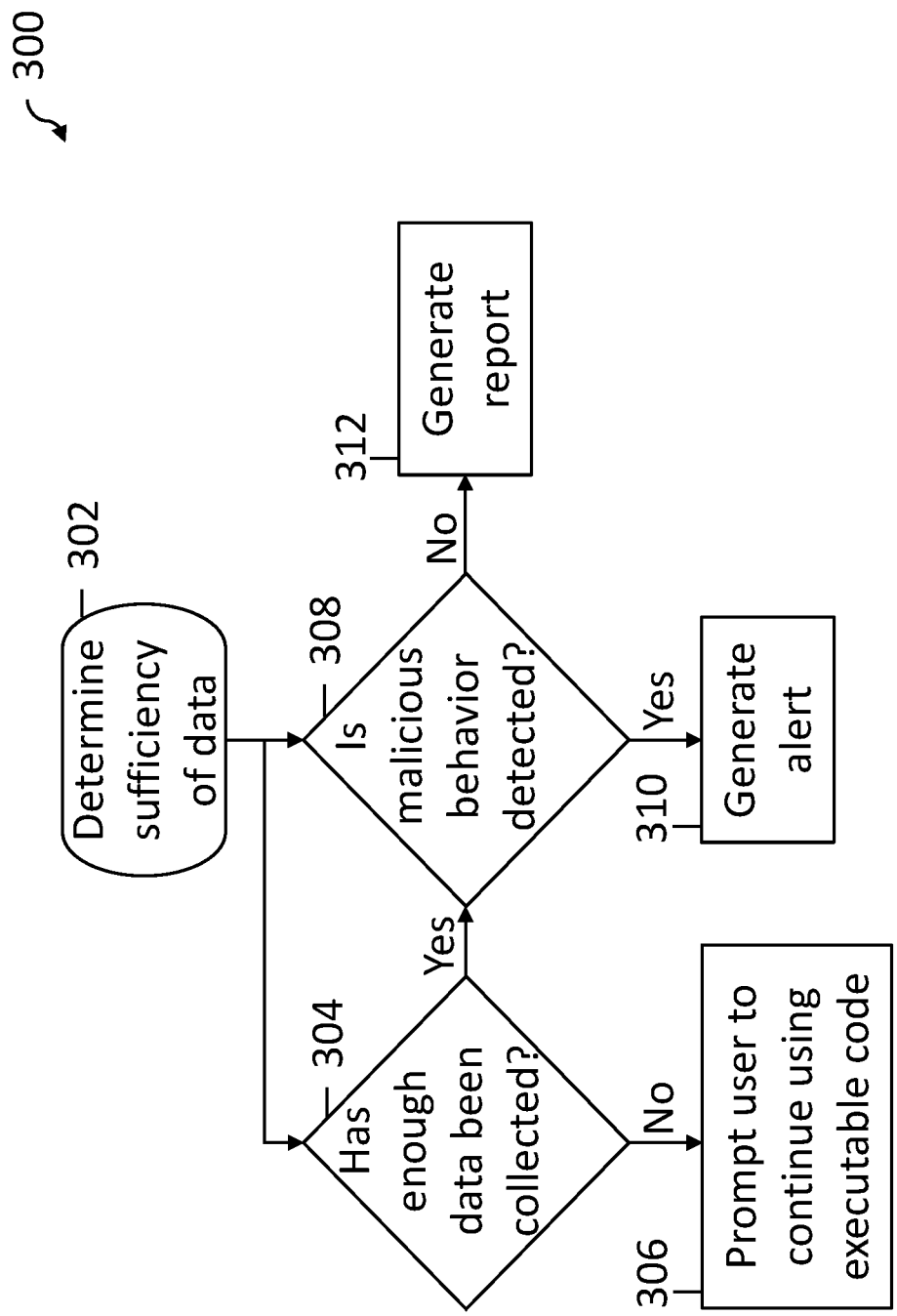
FIG. 3 is a flow diagram depicting a method for a system for utilizing virtual machines to install untrusted executable codes, in accordance with various examples.

Referring now to FIG. 3, a method 300 for a system (e.g., the electronic device 200) for utilizing virtual machines to install untrusted executable codes is provided, in accordance with various examples. The method 300 is for determining a sufficiency of data (302). The method 300 includes determining whether enough data has been collected (304). The method 300 also includes determining whether malicious behavior is detected (308). Responsive to a determination that more data is warranted, the method 300 prompts a user to continue utilizing the executable code (306). Responsive to a determination that enough data has been collected, the method 300 includes determining whether the malicious behavior is detected (308). Responsive to a determination that malicious behavior is detected, the method 300 includes generating an alert (310). Responsive to a determination that malicious behavior is undetected, the method 300 includes generating a report (312).

In various examples, as described above with respect to FIG. 1, responsive to the determination that the user accepts operations of the untrusted executable code, a processor (e.g., the processor 202) determines a sufficiency of data. In other examples, during monitoring of the installation, of the operations, or a combination thereof, of the untrusted executable code, the processor determines the sufficiency of the data, as described above with respect to FIG. 1. The data is event data, as described above with respect to FIG. 1 or 2, for example.

As described above with respect to FIG. 1, during the monitoring of the installation, of the operations, or a combination thereof, of the untrusted executable code, the processor tracks the executed amount of the untrusted executable code. The processor utilizes the executed amount of the untrusted executable code to determine the sufficiency of the event data. Responsive to a determination that the executed amount of the untrusted executable code is less than the threshold amount, the processor prompts the user to continue utilizing the untrusted executable code. Responsive to a determination that the executed amount of the untrusted executable code is equivalent to or exceeds the threshold amount, the processor determines whether the untrusted executable code includes a malware.

In some examples, the processor monitors the installation, the operations, or a combination thereof, of the untrusted executable code according to a binary code coverage analysis technique, a behavioral monitoring technique, or a combination thereof. The binary code coverage analysis technique is utilized to track the executed amount of the untrusted executable code, to track what data is installed to the virtual machine (e.g., the virtual machine 206), to track where the data is installed, or a combination thereof. For example, the untrusted executable code installation includes a library file, a binary file, a configuration file, a registry entry, or other suitable file or data utilized by the untrusted executable code for operations. The behavioral monitoring technique is utilized to track the executed amount of the untrusted executable code, attempts to access a network, attempts to access stored data, or a combination thereof. The binary code coverage analysis technique, the behavioral monitoring technique, or the combination thereof, generate event data.

In various examples, to generate the alert, the processor causes transmission of the alert via a network interface. For example, the processor causes transmission of the alert to a person or group who handles the security policy of an enterprise. In some examples, the processor locks, or password protects, the sandbox until the person or group who handles the security policy examines the sandbox. Responsive to an examination of the sandbox determining that the alert was incorrect, the processor unlocks the sandbox so that the user may continue utilizing the untrusted executable code.

Figure 4:
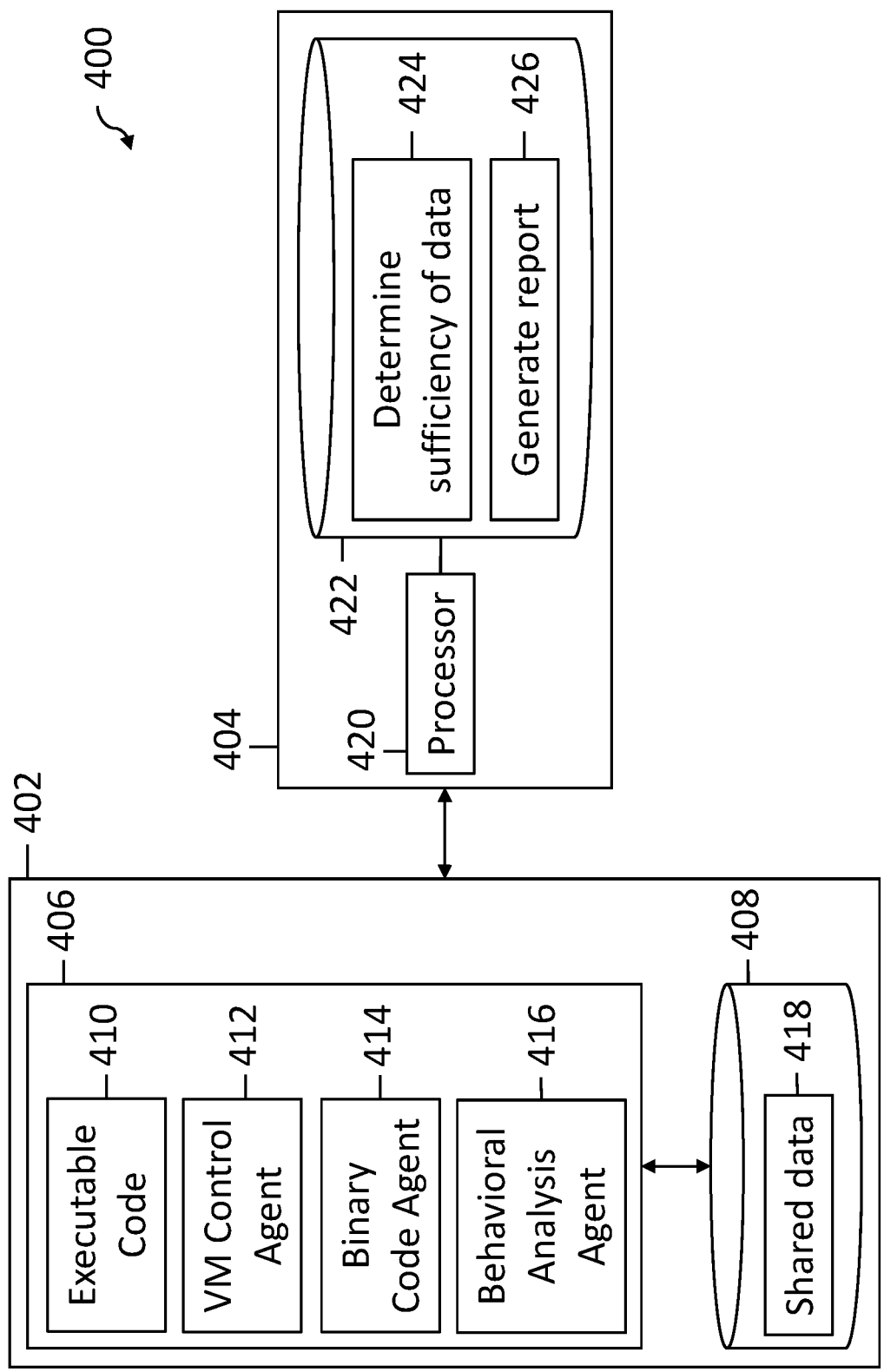
FIG. 4 is a block diagram depicting a system for utilizing virtual machines to install untrusted executable codes, in accordance with various examples.

Referring now to FIG. 4, a block diagram depicting a system 400 for utilizing virtual machines to install untrusted executable codes is provided, in accordance with various examples. The system 400 includes electronic devices 402, 404. An electronic device 402 is the electronic device 200, for example. An electronic device 404 is the electronic device 200, for example. The electronic device 402 includes a virtual machine 406 and a storage device 408. The virtual machine 406 is the virtual machine 206, for example. The storage device 408 is the storage device 204, for example. The electronic device 404 includes a processor 420 and a storage device 422. The processor 420 is the processor 202, for example. The storage device 422 is the storage device 204, for example.

While not explicitly shown, the electronic devices 402, 404 include additional components. The network interfaces enable communication over a network. The network interfaces may include a wired connection, such as Ethernet or universal serial bus (USB), or a wireless connection, such as WI-FI® or BLUETOOTH®, for example. The network is a local area network (LAN), a wide area network (WAN), a virtual private network (VPN), a client/server network, an Internet (e.g., cloud), or any other suitable system for sharing processing and memory resources, for example.

In various examples, the virtual machine 406 includes an executable code 410, a virtual machine (VM) control agent 412, a binary code agent 414, and a behavioral analysis agent 416. The executable code 410 is an untrusted executable code, for example. The VM control agent 412 is a hypervisor, as described above with respect to FIG. 2, for example. The binary code agent 414 performs a binary code coverage analysis technique, as described above with respect to FIG. 3, for example. The behavioral analysis agent 416 performs a behavioral monitoring technique, as described above with respect to FIG. 3, for example. The storage device 408 includes shared data 418. The shared data 418 is stored by the user for utilization with the executable code 410.

In some examples, the storage device 422 stores machine-readable instructions, which, when executed by the processor 420, cause the processor 420 to perform some or all of the actions attributed herein to the processor 420. The machine-readable instructions are the machine-readable instructions 424, 426. The machine-readable instructions are the machine-readable instructions 212, for example. The machine-readable instructions 424, 426, when executed by the processor 420, cause the processor 420 to utilize the virtual machine 406 to install the executable code 410. The machine-readable instruction 424, when executed by the processor 420, causes the processor 420 to determine a sufficiency of data. The machine-readable instruction 426, when executed by the processor 420, causes the processor 420 to generate a report.

As described above with respect to FIG. 1 or 3, responsive to the determination that the user accepts operations of the executable code 410, the processor 420 determines the sufficiency of data. In other examples, during monitoring of the installation, of the operations, or a combination thereof, of the executable code 410, the processor 420 determines the sufficiency of the data, as described above with respect to FIG. 1 or 3. In some examples, during the monitoring of the installation, of the operations, or a combination thereof, of the executable code 410, the processor 420 utilizes the binary code agent 414, the behavioral analysis agent 416, or a combination thereof.

In various examples, responsive to the determination that the source of the executable code 410 is unknown, the processor 420 determines whether multiple users accept the trial install of the executable code 410. Responsive to a determination that a user of the multiple users accepts the trial install, the processor 420 allows installation of the executable code 410 to a virtual machine on an electronic device of the user. For example, the processor 420 allows installation of the executable code 410 to the virtual machine 406 of the electronic device 402. The processor 420 allows installation of the executable code 410 to a second virtual machine (not explicitly shown) of a second electronic device (not explicitly shown) of a second user. The processor 420 aggregates the event data of the multiple users to determine the executed amount of the untrusted executable code.

As described above with respect to FIG. 1 or 3, during the monitoring of the installation, of the operations, or a combination thereof, of the executable code 410, the processor 420 tracks the executed amount of the executable code 410 across the multiple electronic devices. The processor 420 utilizes the executed amount of the executable code 410 to determine the sufficiency of the event data. Responsive to a determination that the executed amount of the executable code 410 is less than the threshold amount, the processor 420 prompts the multiple users to continue utilizing the executable code 410. In some examples, as described above with respect to FIG. 3, responsive to a determination that the executed amount of the executable code 410 is equivalent to or exceeds the threshold amount, the processor 420 determines whether the executable code 410 includes a malware. Responsive to determination that the malware is absent from the executable code 410, the processor 420 generates the report.

By aggregating the event data of the multiple users to determine the executed amount of the executable code 410, the processor 420 reduces an amount of time for evaluating the operations of the executable code 410. For example, a first user of the multiple users utilizes a first portion of the executable code 410, and a second user of the multiple users utilizes a second portion of the executable code 410. Enabling the multiple users to simultaneously utilize the different portions of the executable code 410 and aggregating the event data of the multiple users, the processor 420 reduces an amount of time for evaluating the operations of the executable code 410.

Figure 5:
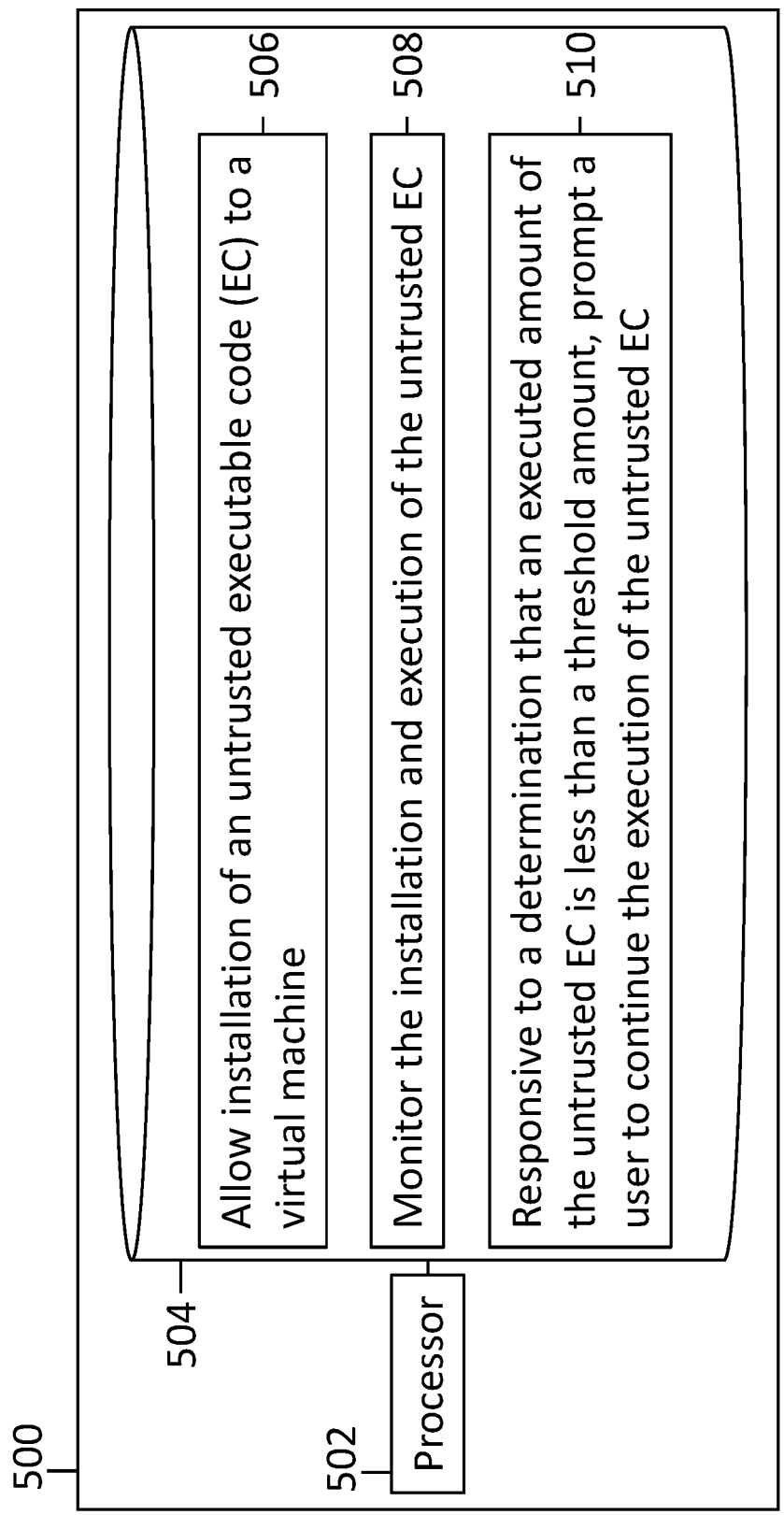
FIG. 5 is a block diagram depicting an electronic device for utilizing virtual machines to install untrusted executable codes, in accordance with various examples.

Referring now to FIG. 5, a flow diagram depicting an electronic device 500 for utilizing virtual machines (e.g., the virtual machine 206, 406) to install untrusted executable codes (e.g., the executable code 410) is provided, in accordance with various examples. The electronic device 500 is the electronic device 200, 402, 404, for example. The electronic device 500 includes a processor 502 and a storage device 504. The processor 502 is the processor 202, 420, for example. The storage device 504 is the storage device 204, 422, for example.

In various examples, the processor 502 is coupled to the storage device 504. The storage device 504 stores machine-readable instructions, which, when executed by the processor 502, cause the processor 502 to perform some or all of the actions attributed herein to the processor 502. The machine-readable instructions are the machine-readable instructions 506, 508, 510. The machine-readable instructions 506, 508, 510 are the machine-readable instructions 212, for example. The machine-readable instructions 506, 508, 510, when executed by the processor 502, cause the processor 502 to utilize the virtual machine to install the untrusted executable code. The machine-readable instruction 506, when executed by the processor 502, causes the processor 502 to allow installation of an untrusted executable code to a virtual machine. The untrusted executable code (EC) is referred to as untrusted EC in FIG. 5. The machine-readable instruction 508, when executed by the processor 502, causes the processor 502 to monitor the installation and execution of the untrusted executable code. Responsive to a determination that the executed amount of the untrusted executable code is less than the threshold amount, the machine-readable instruction 510, when executed by the processor 502, causes the processor 502 to prompt a user to continue the execution of the untrusted executable code.

In some examples, as described above with respect to FIG. 1, for example, responsive to a determination that the untrusted executable code is absent from an allowed list of executable codes, an unallowed list of executable codes, or a combination thereof, the processor 502 allows installation of the untrusted executable code. In various examples, as described above with respect to FIG. 2, for example, the processor 502 generates the virtual machine utilizing a hypervisor.

In various examples, the processor 502 causes a display device (not explicitly shown) to display a prompt for the user to store data for utilization by the untrusted executable code to a first shared folder of the storage device 504. The processor 502 stores an installer for the untrusted executable code to a second shared folder of the storage device 504. The processor 502 allows installation of the untrusted executable code to the virtual machine from the second shared folder.

In some examples, as described above with respect to FIG. 3 or 4, the processor 502 monitors the installation, the execution, or a combination thereof, of the untrusted executable code according to a binary code coverage analysis technique. In other examples, as described above with respect to FIG. 3 or 4, the processor 502 monitors the installation, the execution, or a combination thereof, of the untrusted executable code according to a behavioral monitoring technique.

Figure 6:
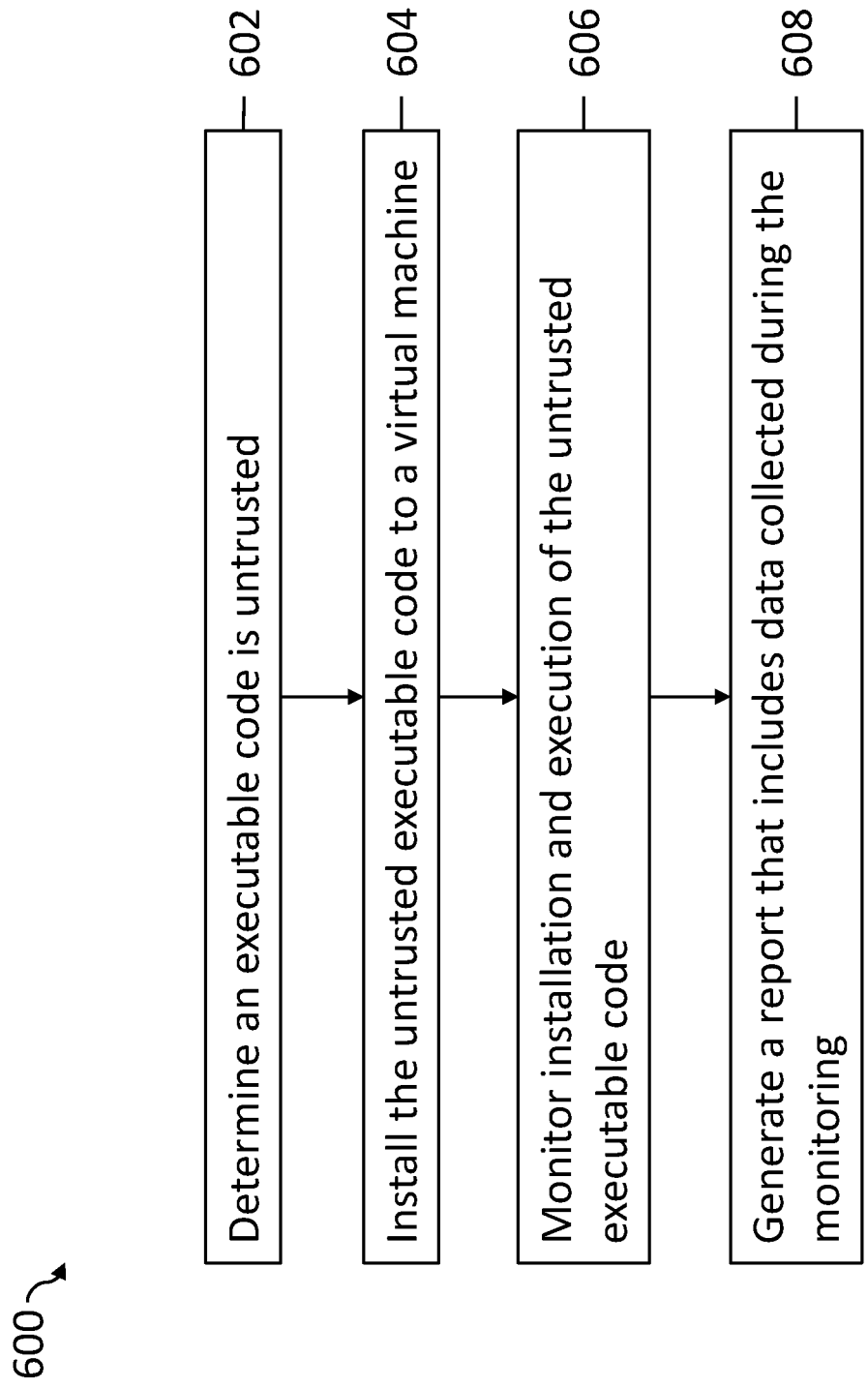
FIG. 6 is a flow diagram depicting a method for a system for utilizing virtual machines to install untrusted executable codes, in accordance with various examples.

Referring now to FIG. 6, a flow diagram depicting a method 600 for a system (e.g., the system 400, the electronic device 200) for utilizing virtual machines (e.g., the virtual machine 206, 406) to install untrusted executable codes (e.g., the executable code 410) is provided, in accordance with various examples. The method 600 includes determining an executable code is untrusted (602). The method 600 also includes installing the untrusted executable code to a virtual machine (604). Additionally, the method 600 includes monitoring installation and execution of the untrusted executable code (606). The method 600 includes generating a report that includes data collected during the monitoring (608).

In various examples, the method 600 determines whether the executable code is untrusted by comparing the executable code to an allowed list of executable codes, an unallowed list of executable codes, or a combination thereof, as described above with respect to FIG. 1 or 5. In some examples, as described above with respect to FIG. 2, the method 600 includes generating the virtual machine by a hypervisor. In some examples, as described above with respect to FIG. 2, the method 600 includes monitoring attempts to access a network by the hypervisor.

In some examples, the method 600 includes determining an executed amount of the untrusted executable code utilized, as described above with respect to FIG. 1, 3, 4, or 5. Responsive to a determination that the executed amount of the untrusted executable code is less than a threshold amount, the method 600 also includes prompting the user to continue execution of the untrusted executable code. Responsive to a determination that the executed amount of the untrusted executable code is equivalent to or exceeds a threshold amount, the method 600 additionally includes notifying the user that sufficient data has been generated.

Figure 7:
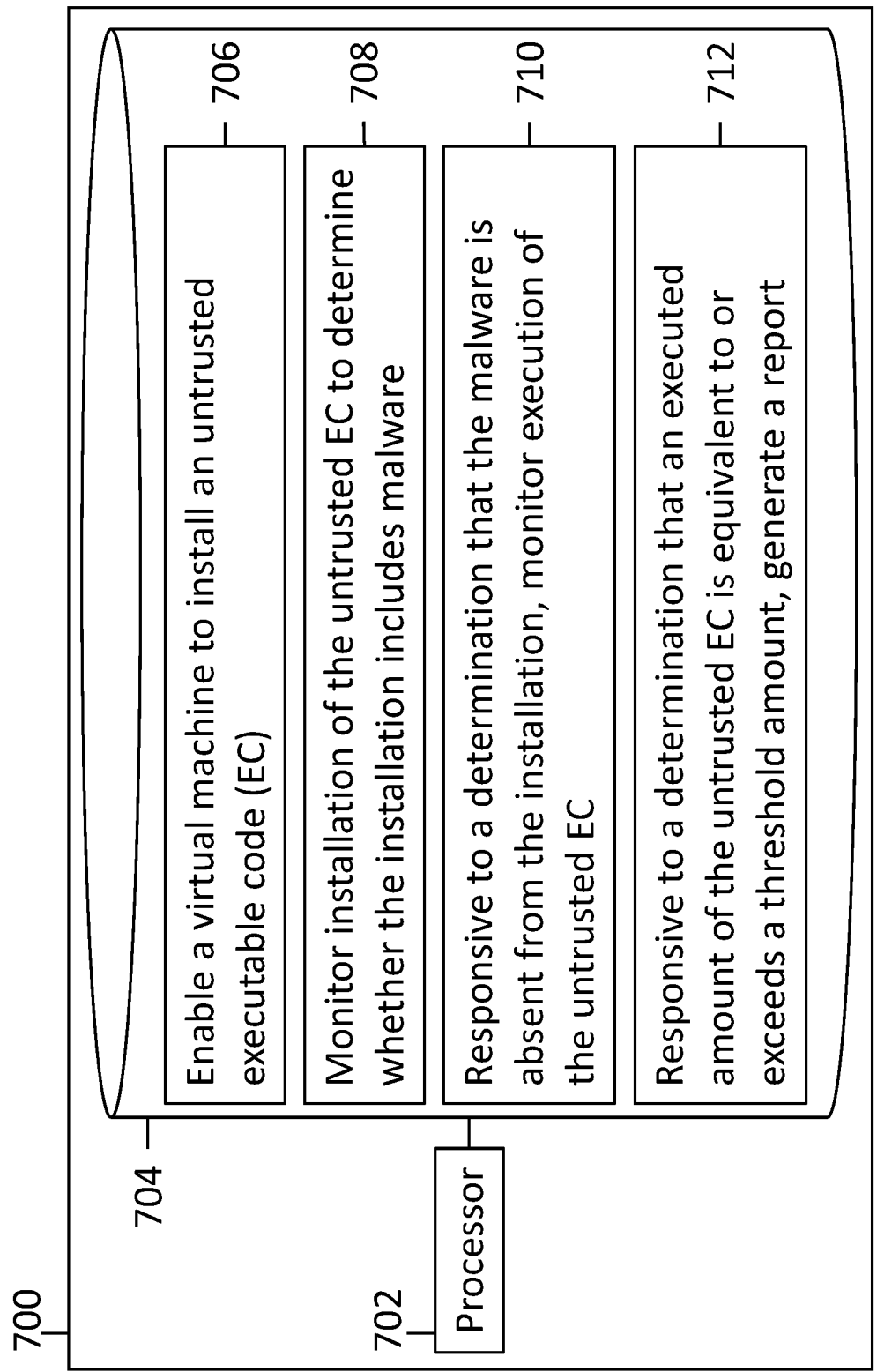
FIG. 7 is a block diagram depicting an electronic device for utilizing virtual machines to install untrusted executable codes, in accordance with various examples.

Referring now to FIG. 7, a block diagram depicting an electronic device 700 for utilizing virtual machines (e.g., the virtual machine 206, 406) to install untrusted executable codes (e.g., the executable code 410) is provided, in accordance with various examples. The electronic device 700 is the electronic device 200, 402, 404, 500, for example. The electronic device 700 includes a processor 702 and a non-transitory machine-readable medium 704. The processor 702 is the processor 202, 420, 502, for example. The non-transitory machine-readable medium 704 is the storage device 204, 422, 504, for example.

In some examples, the processor 702 is coupled to the non-transitory machine-readable medium 704. In various examples, the non-transitory machine-readable medium 704 stores machine-readable instructions, which, when executed by the processor 702, cause the processor 702 to perform some or all of the actions attributed herein to the processor 702. The machine-readable instructions are the machine-readable instructions 706, 708, 710, 712. The machine-readable instructions 706, 708, 710, 712 are the machine-readable instructions 212, for example.

In various examples, the machine-readable instructions 706, 708, 710, 712 when executed by the processor 702, cause the processor 702 to utilize the virtual machine to install the untrusted executable code. The untrusted executable code (EC) is referred to as untrusted EC in FIG. 7. The machine-readable instruction 706, when executed by the processor 702, causes the processor 702 to enable the virtual machine to install the untrusted executable code. The machine-readable instruction 708, when executed by the processor 702, causes the processor 702 to monitor installation of the untrusted executable code to determine whether the installation includes a malware. Responsive to a determination that the malware is absent from the installation, the machine-readable instruction 710, when executed by the processor 702, causes the processor 702 to monitor execution of the untrusted executable code. Responsive to a determination that an executed amount of the untrusted executable code is equivalent to or exceeds a threshold amount, the machine-readable instruction 712, when executed by the processor 702, causes the processor 702 to generate a report.

In some examples, as described above with respect to FIG. 1, the processor 702 terminates the virtual machine responsive to a determination that the installation includes the malware. In various examples, the processor 702 monitors the installation, the execution, or a combination thereof, according to a binary code coverage analysis technique, a behavioral monitoring technique, a hypervisor, or a combination thereof. The processor 702 utilizes a binary code agent (e.g., the binary code agent 414) to perform the binary code coverage analysis technique, for example. The processor 702 utilizes a behavioral analysis agent (e.g., the behavioral analysis agent 416) to perform the behavioral monitoring technique, for example.

In various examples, the processor 702 monitors the execution of the untrusted executable code to determine whether the installation includes a malware. The processor 702 terminates the virtual machine responsive to a determination that the execution includes the malware. In some examples, the processor 702 causes a display device (not explicitly shown) to display a prompt responsive to a determination that the executed amount of the untrusted executable code is less than the threshold amount. The prompt instructs the user to continue utilizing the untrusted executable code.

Unless infeasible, some or all of the method 100, 300, 600 may be performed by a processor (e.g., the processor 202, 420, 502, 702) concurrently or in different sequences and by circuitry of a system (e.g., the system 400, the electronic device 200, 500, 700), execution of machine-readable instructions of the system (e.g., the machine-readable instructions 212), or a combination thereof. For example, the method 100, 300, 600 is implemented by machine-readable instructions stored to a storage device (e.g., the storage device 204, 422, 504, the non-transitory machine-readable medium 704, or another storage device not explicitly shown of the system), circuitry (some of which is not explicitly shown) of the system, or a combination thereof. The processor executes the machine-readable instructions to perform some or all of the method 100, 300, 600, for example.

While some components are shown as separate components of the electronic device 200, 404, 500, 700, in other examples, the separate components are integrated in a single package. For example, the storage device 204, 422, 504 is integrated with the processor 202, 420, 502, respectively. The single package may herein be referred to as an integrated circuit (IC) or an integrated chip (IC).

The above description is meant to be illustrative of the principles and various examples of the present description. Numerous variations and modifications become apparent to those skilled in the art once the above description is fully appreciated. It is intended that the following claims be interpreted to embrace all such variations and modifications.

In the figures, certain features and components disclosed herein are shown in exaggerated scale or in somewhat schematic form, and some details of certain elements are not shown in the interest of clarity and conciseness. In some of the figures, in order to improve clarity and conciseness, a component or an aspect of a component are omitted.

In the above description and in the claims, the term "comprising" is used in an open-ended fashion, and thus should be interpreted to mean "including, but not limited to . . . ." Also, the term "couple" or "couples" is intended to be broad enough to encompass both direct and indirect connections. Thus, if a first device couples to a second device, that connection may be through a direct connection or through an indirect connection via other devices, components, and connections. Additionally, the word "or" is used in an inclusive manner. For example, "A or B" means any of the following: "A" alone, "B" alone, or both "A" and "B."

What is claimed is:

1. A electronic device, comprising:
a storage device; and
a hardware processor configured to execute machine-readable instructions contained in the storage device such that the hardware processor is configured to:
receive a request from a user to download an application including untrusted executable code to the electronic device;
install the application including the untrusted executable code to a virtual machine such that the virtual machine executes the untrusted executable code;
monitor the execution of the application including the untrusted executable code by the virtual machine;
determine that an amount of the untrusted executable code that has been executed by the virtual machine does not exceed a threshold;
responsive to determining that the amount of the untrusted executable code that has been executed by the virtual machine does not exceed the threshold, prompt the user to continue the execution of the application including the untrusted executable code by the virtual machine;
determine that the amount of the untrusted executable code that has been executed by the virtual machine exceeds the threshold;
determine that malware is absent from the untrusted executable code; and
responsive to determining that the amount of the untrusted executable code that has been executed by the virtual machine exceeds the threshold and determining that malware is absent from the untrusted executable code, allow installation of the application including the untrusted executable code on the electronic device.

2. The electronic device of claim 1, wherein the hardware processor is configured to execute the machine-readable instructions contained in the storage device such that the hardware processor is configured to allow installation of the application including the untrusted executable code responsive to determining that the untrusted executable code is absent from an unallowed list of executable codes.

3. The electronic device of claim 2, wherein the unallowed list of executable codes is maintained by a business entity associated with the user.

4. The electronic device of claim 1, wherein the hardware processor is configured to execute the machine-readable instructions contained in the storage device such that the hardware processor is configured to generate the virtual machine utilizing a hypervisor that emulates an operating environment of the electronic device.

5. The electronic device of claim 1, wherein the hardware processor is configured to execute the machine-readable instructions contained in the storage device such that the hardware processor is configured to:
cause the electronic device to display a prompt for the user to store data for utilization by the untrusted executable code to a first shared folder of the storage device;
store an installer for the untrusted executable code to a second shared folder of the storage device; and
allow installation of the application including the untrusted executable code to the virtual machine from the second shared folder.

6. The electronic device of claim 1, wherein the hardware processor is configured to execute the machine-readable instructions contained in the storage device such that the hardware processor is configured to monitor the execution of the application including the untrusted executable code by the virtual machine according to a binary code coverage analysis technique.

7. The electronic device of claim 1, wherein the hardware processor is configured to execute the machine-readable instructions contained in the storage device such that the hardware processor is configured to monitor the execution of the application including the untrusted executable code by the virtual machine according to a behavioral monitoring technique.

8. The electronic device of claim 1, wherein the threshold is adjustable.

9. A computer-implemented method, comprising:
receiving a request from a user to download an application to an electronic device;
determining that the application includes untrusted executable code;
installing the application including the untrusted executable code to a virtual machine such that the virtual machine executes the untrusted executable code;
monitoring the execution of the application including the untrusted executable code by the virtual machine;
determining that an amount of the untrusted executable code that has been executed by the virtual machine does not exceed a threshold;
responsive to determining that the amount of the untrusted executable code that has been executed by the virtual machine does not exceed the threshold, prompting the user to continue the execution of the application including the untrusted executable code by the virtual machine;
determining that the amount of the untrusted executable code that has been executed by the virtual machine exceeds the threshold;
determining that malware is absent from the untrusted executable code; and
responsive to determining that the amount of the untrusted executable code that has been executed by the virtual machine exceeds the threshold and determining that malware is absent from the untrusted executable code, allowing installation of the application including the untrusted executable code on the electronic device.

10. The method of claim 9, comprising generating the virtual machine using a hypervisor that emulates an operating environment of the electronic device.

11. The method of claim 10, comprising monitoring attempts to access a network by the hypervisor.

12. The method of claim 9, wherein monitoring the execution of the application including the untrusted executable code by the virtual machine comprises monitoring the execution of the application including the untrusted executable code by the virtual machine using a binary code coverage analysis technique or a behavioral monitoring technique.

13. The method of claim 9, comprising allowing the installation of the application including the untrusted executable code on the electronic device responsive to determining that the untrusted executable code is absent from an unallowed list of executable codes maintained by a business entity associated with the user.

14. The method of claim 9, wherein the threshold is adjustable.

15. A non-transitory machine-readable medium storing machine-readable instructions, which, when executed by a processor, cause the processor to:
   receive a request from a user to download an application including untrusted executable code to an electronic device;
   enable a virtual machine to install and execute the application including the untrusted executable code;
   monitor the installation and the execution of the application including the untrusted executable code by the virtual machine;
   determine that an amount of the untrusted executable code that has been executed by the virtual machine does not exceed a threshold;
   cause the electronic device to display a prompt responsive to the determination that the amount of the untrusted executable code that has been executed by the virtual machine does not exceed the threshold, the prompt instructing the user to continue the execution of the application including the untrusted executable code by the virtual machine;
   determine that the amount of the untrusted executable code that has been executed by the virtual machine exceeds the threshold;
   determine that malware is absent from the untrusted executable code; and
   responsive to the determination that the amount of the untrusted executable code that has been executed by the virtual machine exceeds the threshold and the determination that malware is absent from the untrusted executable code, allow installation of the application including the untrusted executable code on the electronic device.

16. The non-transitory machine-readable medium of claim 15, wherein the machine-readable instructions, when executed by the processor, cause the processor to:
   determine that the untrusted executable code is absent from an unallowed list of executable codes maintained by a business entity associated with the user; and
   responsive to the determination that the untrusted executable code is absent from the unallowed list of executable codes, allow the installation of the application including the untrusted executable code on the electronic device.

17. The non-transitory machine-readable medium of claim 15, wherein the machine-readable instructions, when executed by the processor, cause the processor to monitor the execution of the application including the untrusted executable code by the virtual machine according to a binary code coverage analysis technique, a behavioral monitoring technique, or a combination thereof.

18. The non-transitory machine-readable medium of claim 15, wherein the machine-readable instructions, when executed by the processor, cause the processor to generate the virtual machine utilizing a hypervisor that emulates an operating environment of the electronic device.

19. The non-transitory machine-readable medium of claim 18, wherein the machine-readable instructions, when executed by the processor, cause the processor to monitor attempts to access a network by the hypervisor.

20. The non-transitory machine-readable medium of claim 15, wherein the threshold is adjustable.

* * * * *